July 8, 1969 A. T. CHARLTON 3,453,680
PLASTIC WINDSCREEN WIPER CONNECTOR ASSEMBLY
Filed Dec. 2, 1966
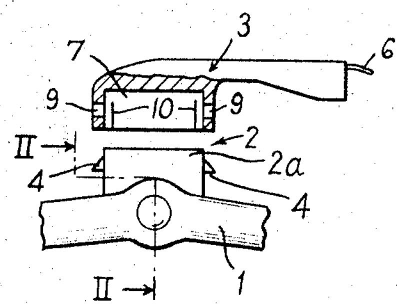
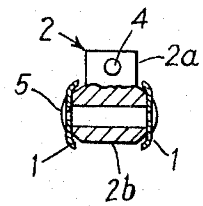
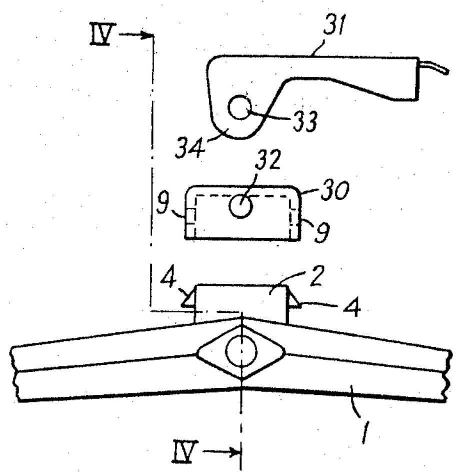
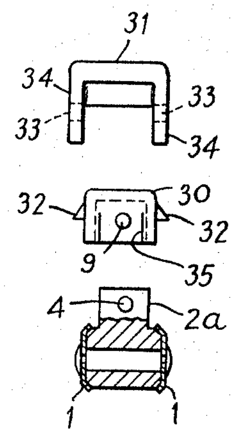

United States Patent Office 3,453,680

Patented July 8, 1969

3,453,680

PLASTIC WINDSCREEN WIPER CONNECTOR ASSEMBLY

Arthur T. Charlton, Osterley, England, assignor to Magnatex Limited, Hayes, England Filed Dec. 2, 1966, Ser. No. 598,666
Int. Cl. B60s *1/32;* A47l *1/00*
U.S. Cl. 15—250.33 3 Claims

ABSTRACT OF THE DISCLOSURE

A connector assembly for connecting a windscreen wiper to a wiper arm comprising two elements, one of which has a rectangular hollow cavity adapted to receive a complementary part of the other element, the end walls of the cavity having apertures to receive pivot pins projecting from the ends of said complementary part to permit relative rocking of the two elements about the axis of said pins, and the said cavity being so constructed that the end walls thereof can be resiliently flexed apart by the pins during assembly of the two elements by forcing them together until the apertures align with the pins and the end walls snap inwards to engage the pins.

The present invention relates to windscreen wipers, and more particularly to a connector assembly for connecting a windscreen wiper to a wiper arm. The connector assembly according to this invention is particularly suitable for use with a wiper for wiping curved windscreens, as it permits the blade superstructure both to pivot relative to the arm about an axis transverse to the length of the blade, and also to rock to a trailing position about an axis extending lengthwise of the blade.

The connector assembly according to the invention comprises two elements moulded of a synthetic resin material one of which is formed with a substantially rectangular hollow cavity which is adapted to receive a complementary part of the other element the end walls of the cavity having apertures to receive pivot pins projecting from the ends of said complementary part to permit relative rocking of the two elements about the axis of said pins within limits determined by the clearance between the walls of the cavity and said complementary part, and the said cavity being so constructed that the end walls thereof can be resiliently flexed apart by the pins during assembly of the two elements by forcing them together until the apertures align with the pins and the end walls snap inwards to engage the pins. The ends of the pins, which may be moulded integrally with the complementary part, may have their ends chamfered to facilitate forcing them between the end walls of the cavity. One of the elements is secured to or integral with the blade superstructure and the other element is secured to or integral with a clip for receiving the end of a wiper arm, at least one of the elements being secured to the blade superstructure or clip by pivot means of which the axis extends transversely of the length of the blade.

In order that the invention may be more clearly understood reference will now be made to the accompanying drawings, in which:

FIG. 1 is an exploded elevation of the two elements according to one embodiment of the invention, the cavity of one element being integral with the arm clip.

FIG. 2 is a section of the line II—II of FIG. 1.

FIG. 3 is an exploded view of another embodiment.

FIG. 4 is a view along the line IV—IV of FIG. 3.

Referring to the drawings, 1 is the bridge piece of the superstructure of a curved wiper blade. The connector comprises two elements 2 and 3. The element 2 is moulded of a synthetic resin material, the upper part of which is shaped as a rectangular block 2*a* having pivot pins 4 projecting from each end thereof, the lower part 2*b* of the element 2 being pivotally mounted between the side members of the bridge piece 1 by means of a rivet 5 which passes through an aperture in the lower part 2*b* of the element 2. The parts of the element 2 surrounding the aperture are formed as bosses and the rivet 5 is of stepped formation so that when the members of the bridge piece are rivetted together the element 2 is free to pivot on the rivet 5 to provide the pivoting about an axis transverse to the length of the blade.

The second element 3 is constructed in the form of a clip, being principally of a synthetic resin material and containing an opening at one end for the introduction of a wiper arm which is releasably retained therein by the leaf spring 6 in known manner. The other end of the clip is formed with a hollow cavity 7 of generally rectangular shape adapted to fit over the part 2*a* of the element 2, the end walls of the cavity being provided with apertures 9 adapted to receive the pivot pins 4. The element 3 is moulded of a substantially rigid but resiliently flexible plastics material and its side walls are provided with slits 10 which enable the end walls to be resiliently flexed apart to be fitted over the pins 4. The pins 4 have their ends chamfered in the downward direction to facilitate pushing the element 3 on to the element 2 so that when the apertures 9 align with the pins 4 the end walls of the cavity snap inwards to hold the two parts assembled together. There is a slight clearance between the side walls of the cavity and of the part 2*a* of the element 2 so as to permit limited rocking movement of the element 2 relative to the element 3 about the axis of the pins 4.

FIGURES 3 and 4 show another embodiment in which the element 2 instead of being pivoted between the members of the bridge piece is rigidly fixed therebetween. The second element 30 is in this case made separate from the clip part 31 which is adapted to receive the end of the wiper arm. In this case the element 30 is moulded as a block with a hollow cavity having apertures 9 in its end walls to pivot on the pins 4 and additionally has pins 32 projecting outwardly from its side walls which are adapted to be received in apertures 33 in side webs 34 on the clip portion 31. The pins 32 are preferably, like the pins 4, chamfered in the downward direction so that the clip portion can be assembled to the element 30 by forcing the webs 34 over the pins 32 until the latter engage in the apertures 33 when the webs spring inwards to hold the parts assembled together.

In this embodiment, instead of providing slots, such as 10, in the side walls of the cavity, slots 35 are provided in one or both end walls to allow the end walls to flex apart.

It will be understood that various modifications may be made without departing from the scope of the invention. For example the bridge piece of the wiper blade superstructure may also be moulded of synthetic resin material, conveniently with both side members integrally joined by a block extending therebetween at the midpoint or some other convenient point therealong, said block having a passage therethrough to receive the lower part of the element 2 to which it may be connected by a rivet either for pivoting movement or with the element 2 fixed to the bridge piece. One of the elements may also be moulded integrally with the bridge piece.

In another embodiment the cavity may be formed without side walls. In this case the rocking movement of one element relative to the other may be limited by the base of the cavity engaging with the top of the other element, or in any other convenient manner.

I claim:

1. A connector assembly for connecting a windscreen wiper to a wiper arm, comprising two elements moulded of a synthetic resin material, one of which is formed with a substantially rectangular hollow cavity which is adapted to receive a complementary part of the other element, the end walls of the cavity having apertures to receive pivot pins projecting from the ends of said complementary part to permit relative rocking of the two elements about the axis of said pins within limits determined by the clearance between the walls of the cavity and said complementary part, and the said cavity being so constructed that the end walls thereof can be resiliently flexed apart by the pins during assembly of the two elements by forcing said two elements together until the apertures align with the pins and the end walls snap inwards to engage the pins, at least one of the walls of said cavity having slits extending from the free edge of the cavity to permit the end walls of the cavity to be flexed apart.

2. A connector assembly as claimed in claim 1, wherein said one element is moulded integrally with a clip for receiving the end of a wiper arm and said slits are provided in the side walls of said cavity adjacent the end walls thereof and wherein said other element is mounted on a pivot pin extending between side members of a bridge piece of a wiper blade superstructure for pivotal movement about an axis transverse to the length of the blade, said other element including a part moulded integrally with said complementary part and having an aperture therethrough receiving the pivot pin and bosses surrounding opposite ends of said aperture and engaging said side members.

3. A connector assembly as claimed in claim 1, wherein said one element is mounded in the form of a block having said cavity therein and has a pair of aligned pivot pins projecting outwardly from its side walls, said pivot pins being received in aligned apertures in spaced side webs of a slip for receiving the end of a wiper arm and having their ends chamfered to facilitate forcing them between said side webs, and wherein said other element includes a part rigidly fixed between side members of a bridge piece of a wiper blade superstructure by a rivet passing through said side members and said part.

References Cited

UNITED STATES PATENTS 2,798,244 7/1957 Nesson ---------- 15—250.32
3,179,969 4/1965 Glynn ---------- 15—250.32

FOREIGN PATENTS 665,359 1/1952 Great Britain.

WALTER A. SCHEEL, *Primary Examiner.*

R. I. SMITH, *Assistant Examiner.*